Figure 1:
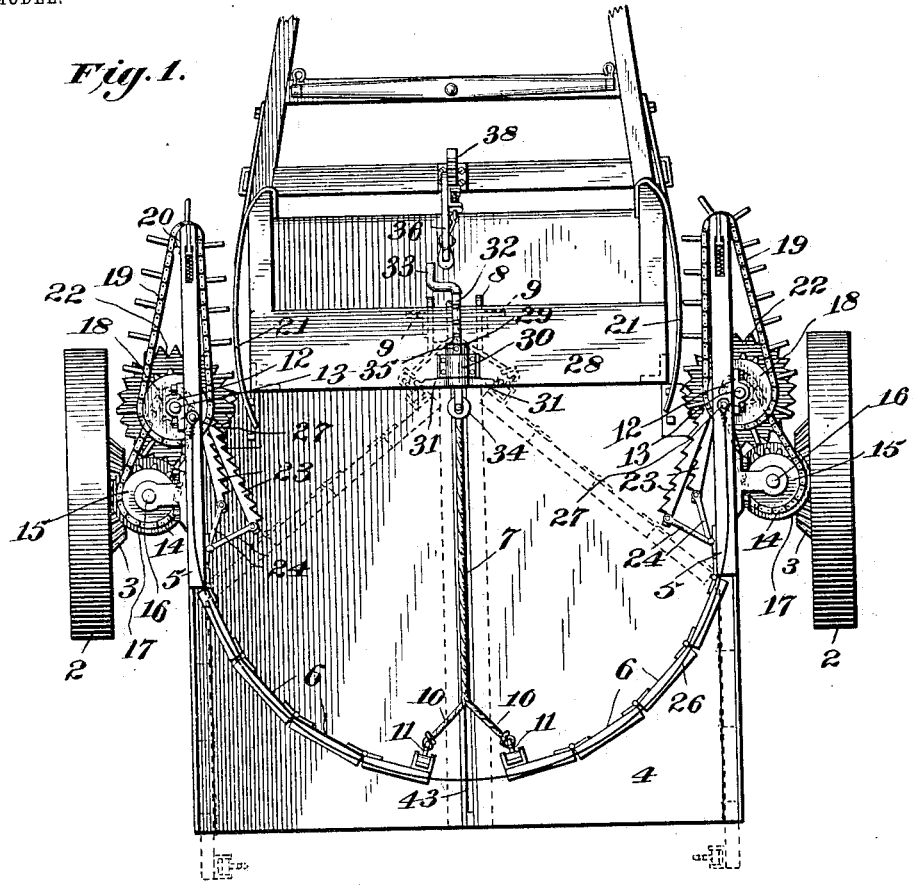

No. 758,748. PATENTED MAY 3, 1904.
W. H. GERNAND.
MACHINE FOR SHOCKING CORN.
APPLICATION FILED AUG. 4, 1902.
NO MODEL. 2 SHEETS—SHEET 1.

WITNESSES
Elmer Seavey
E. A. Caldwell.

INVENTOR
William H. Gernand
by W. T. Shedman
Attorney.

No. 758,748. PATENTED MAY 3, 1904.
W. H. GERNAND.
MACHINE FOR SHOCKING CORN.
APPLICATION FILED AUG. 4, 1902.
NO MODEL. 2 SHEETS—SHEET 2.

WITNESSES
Elmer Leavey
C. Q. Caldwell

INVENTOR
William H. Gernand
by his Attorney

No. 758,748. Patented May 3, 1904.

UNITED STATES PATENT OFFICE.

WILLIAM HENRY GERNAND, OF ALVIN, ILLINOIS.

MACHINE FOR SHOCKING CORN.

SPECIFICATION forming part of Letters Patent No. 758,748, dated May 3, 1904.

Application filed August 4, 1902. Serial No. 118,258. (No model.)

*To all whom it may concern:*

Be it known that I, WILLIAM HENRY GERNAND, a citizen of the United States, residing at Alvin, in the county of Vermilion and State of Illinois, have invented certain new and useful Improvements in Machines for Shocking Corn; and I do declare the following to be a full, clear, and exact description of the invention, such as will enable others skilled in the art to which it appertains to make and use the same, reference being had to the accompanying drawings, and to the figures of reference marked thereon, which form a part of this specification.
This invention relates to corn-shockers of that type which are intended to travel between the rows of standing corn, gather the stalks, preferably on both sides of the machine, sever them near the lower ends, deliver the cut stalks in an upright position to binding devices, and finally deposit the shock in an upright position on the ground in the rear of the machine.

The present invention has for its object to provide a corn-shocker of the type described which is simple and cheap in construction, efficient in operation, of light draft, and which shall perform the successive operations of gathering, cutting, binding, and delivering the corn for the most part automatically, so as to relieve the operator to a large extent from the labor of manipulating the various instrumentalities manually.

The present machine is similar in some respects to the machine shown in my Patent No. 688,630, dated December 10, 1901, but possesses certain advantages and improvements over such machine, as will appear from the detailed description hereinafter.
In the drawings herewith I have illustrated one embodiment of my invention, and in said drawings—

Figure 4:
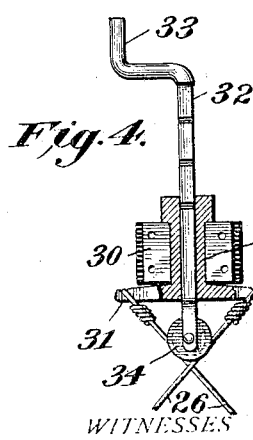
Figure 5:
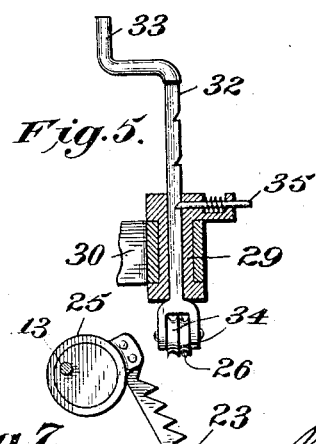
Figure 6:
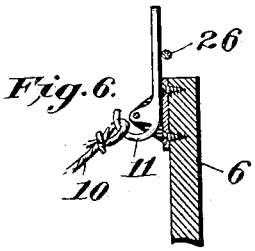
Figure 7:
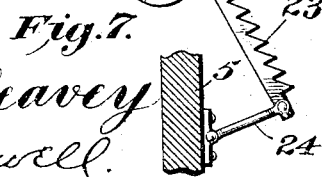
Figure 2:
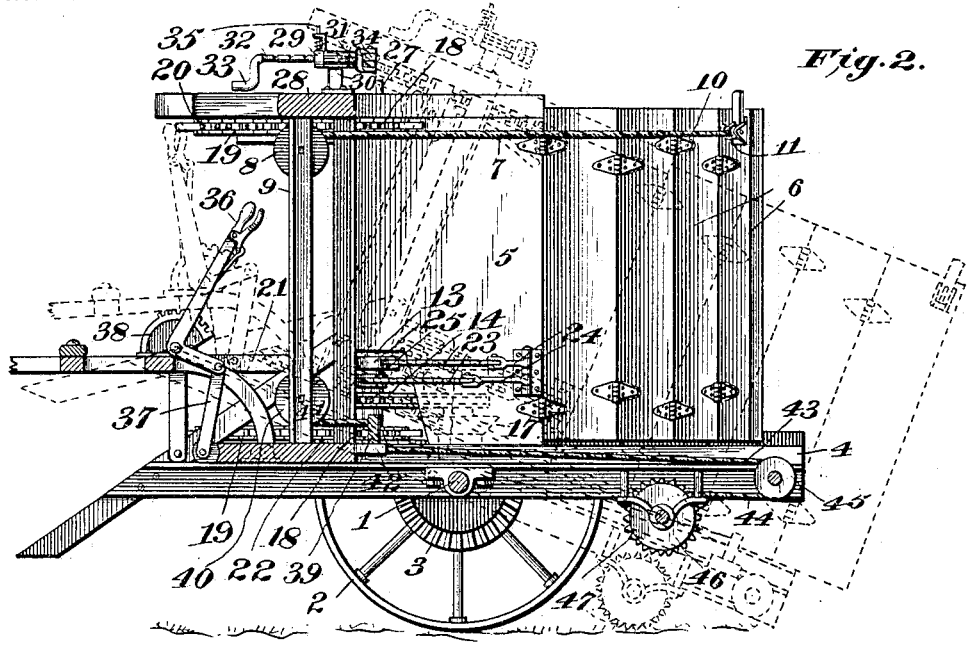
Figure 3:
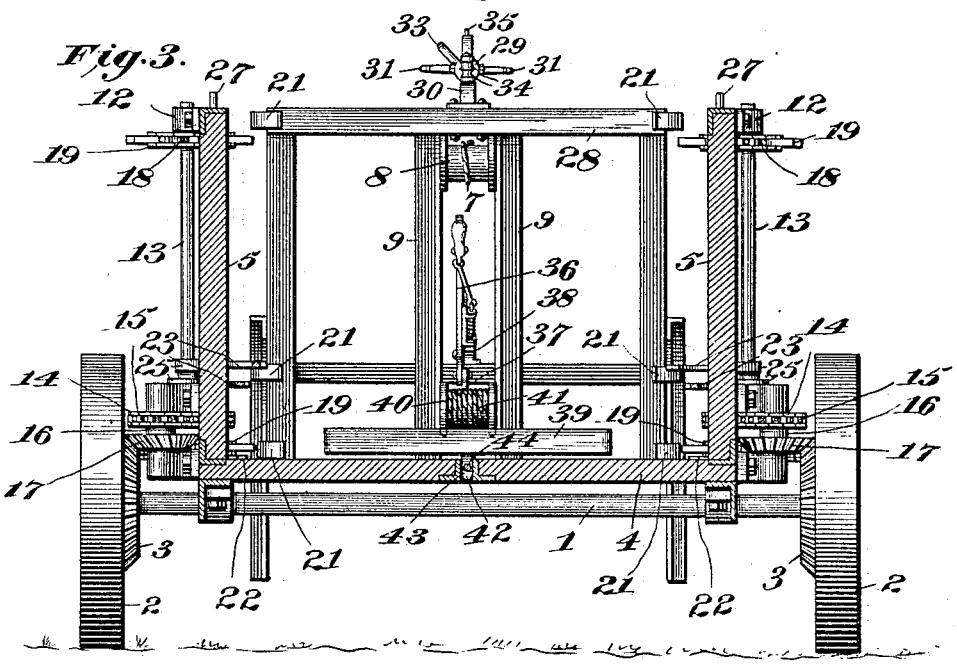
Figure 8:
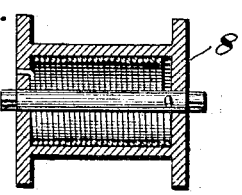

Figure 1 is a plan view of a shocker embodying my improvements. Fig. 2 is a central longitudinal sectional view, the machine being shown in its two operative positions in full and dotted lines. Fig. 3 is a transverse sectional view taken just in the rear of the axle, Fig. 2. Figs. 4 and 5 are enlarged detail views of the shock binding and tying devices. Fig. 6 is a detail view of one of the automatic crib holding and releasing devices. Fig. 7 is a detail view of one of the stalk feeding and compacting instrumentalities. Fig. 8 is a sectional view of a spring-drum, to which reference will be made hereinafter.

Referring to the drawings by numerals, like numbers indicating like parts in the several views, 1 designates the axle of the machine, which is supported on driving-wheels 2, having main drive-gears 3 on their inner faces. Mounted on said axle is a platform 4, said platform having vertical sides 5, which form the forward fixed part of the corn-receiving crib.
The said platform and shocker-frame are preferably of angle-iron construction for the sake of lightness and rigidity. Secured to the rear ends of the sides 5 of the frame are flexible crib-sections, which are made up of a series of boards 6, hinged together, as shown, which sections form a collapsible crib which receives the cut stalks. Said hinged sections normally lie in the forward inclined or collapsed position, (shown in dotted lines in Fig. 1,) being drawn and held in this position by means of a cord 7, which passes from a spring-drum 8, mounted in suitable uprights 9, the end of the cord being divided, as shown, each strand 10 of the cord engaging pivoted hooks or release devices 11, mounted on the end boards of the flexible crib-sections.

Mounted in suitable bearings 12 on the fixed sides 5 of the crib are vertical shafts 13, each of which has a sprocket-wheel thereon around which passes a drive-chain 14, which engages a sprocket-wheel 15, carried on a stub-shaft 16, mounted in suitable brackets on the machine-frame, said stub-shaft having a miter-gear 17 thereon, which engages the main drive-gear 3 on the driving-wheel of the machine, so that as the machine is drawn forward motion will be imparted to the said vertical shaft 13. Mounted on each of the shafts 13 are sprocket-wheels 18, over which run carrier-chains 19, two of these chains for each shaft, one at the upper end thereof and the other at the lower end being shown in the present case, the said drive-chains passing over spring-mounted sprocket-wheels 20, mounted at the forward end of the fixed crib sides 5 of the machine, so that a constant tension is kept on the carrier-chains 19. The said carrier-chains 19 travel backward through a throat or passage between the crib sides 5 and the forwardly-projecting portion of the machine-platform 4 and serve to direct the standing corn into said passage, spring-fingers 21 on the machine-frame coacting with the carrier-chains 19 to keep the corn in upright position. At the lower end of the said vertical shafts 13 are mounted the stalk-cutters 22, which, coöperating with the lower spring-fingers 21 as the stalks are carried back through the throat or passage by the carrier-chain, sever them, and they are then delivered from the said passage to the machine-platform and the crib in standing position. As the stalks are severed and carried back by chains 19 they are seized by feeders 23, two being shown in the present instance, said feeders 23 consisting of ratchet-faced bars, which are linked to the crib sides 5 at their rear ends by means of links 24 and at their forward ends have eccentric-collars 25, engaging eccentrics carried by the shafts 13, so that as the shafts 13 are revolved during the operation of the machine a rearward pushing motion is imparted to the said feeders 23, and the cut corn is crowded back into the crib and compressed into a shock as it is delivered by the cutting and carrying devices. As the corn is delivered by the said feeding devices into the crib it is crowded against the flexible collapsed sections of the crib, and these flexible sections yielding under the pressure of the incoming corn are gradually moved backward or undistended against the pulling action of the cord 7 until they have reached the position shown in full lines in Fig. 1, at which time a full shock of corn will have been formed, such shock being held in place by the flexible crib-sections, which are prevented from opening by the spring-held cord 7 engaging hooks or detents 11 on the crib-sections, as clearly shown in Fig. 1. In this position the shock is ready for binding, and the binding operation will now be described.

The binder 26, which is preferably of wire, is held by means of a loop at each end on pins 27 in the top of the fixed sides 5 of the crib, and the binder extends rearwardly of the machine, so that as the shock is crowded into the flexible crib-section the said crib will expand until the shock fills the binder. When this occurs, the upwardly-projecting tails of the crib-holding hooks 11 will strike against the binder 26 and be automatically thrown out of engagement with the crib-holding cord 7, releasing the flexible crib-sections, which will then move into the rearward dotted-line position shown in Fig. 1, said cord 7 being immediately drawn up on the spring-drum 8, said spring-drum being provided with a retracting-spring which normally tends to keep the cord 7 wound up on the drums, as will be apparent from Fig. 8 of the drawings.

Mounted upon a cross-piece 28, which may form the machine-seat, is a binding and tying device which consists of a rotary sleeve 29, mounted in a suitable bracket 30, said sleeve having integral arms 31 projecting therefrom, which arms are notched at their outer ends, so as to engage and hold the loops at the ends of the binder 26, said loops, when the shock has been formed as before described, being unshipped from the pins 27 by the operator and brought around in front of the shock, crossed upon each other, and then looped over the notched ends of the arms 31 on the said sleeve 29, as shown in Fig. 4 of the drawings. Passing through the said sleeve 29 is a square shaft 32, said shaft 32 sliding freely in the sleeve 29 and having a crank 33 at its outer end by which it may be turned, and with it the said sleeve 29. At its inner end said shaft 32 is provided with sheaves 34, which bear against the crossed ends of the binder 26, and when the said shaft 32 is forced inwardly will take up the slack of the binder and compress the shock, a spring-pin 35 engaging notches in the said shaft 32 to hold it in adjusted position. After the slack of the binder 26 has been taken up and the shock is compressed to the desired degree the said shaft 32 and sleeve 29 are rotated by means of the crank 33 and the binder 26 is twisted, so as to form the tie. The looped ends of the binder are then disengaged from the arms 31 and the compressed and bound shock stands upon the machine-platform 4 ready for delivery.

To deliver the shock in standing position upon the ground immediately in the rear of the machine, I provide means for tilting the machine-frame, such means comprising a hand-lever or equivalent device 36, which is pivoted to the cross-bar of the shafts of the vehicle, as shown in Figs. 1 and 2, said hand-lever being connected by means of a link 37 with the forward end of the platform 4 of the machine and being provided with a locking-pawl which engages a suitable toothed segment 38 for adjustment of the platform. It will be readily seen that by throwing the hand-lever 36 forward the platform and its supported parts will be tilted to the position shown in dotted lines in Fig. 2, inclining the platform so as to slide the shock to the ground. To insure the removal of the shock from the platform 4, I provide a shock-shifting device, which consists of a bar 39, extending transversely of the platform 4 and being normally held at the forward end of the platform in the position shown in Fig. 2 by a spring-drum 40, which forms a take-up for a cord 41, attached to the bar 39. Said bar 39 has a downwardly-projecting lug 42, which lies in a slot 43 in the platform 4, said lug having attached to it one end of a cord 44, which passes to the rear of the machine over an idle sheave 45 and is secured to a drum or ground-wheel 46, mounted in suitable supporting-brackets on the under side of the platform 4, the ground-wheel 46 having projections or teeth 47, which, when the platform 4 with the shock thereon is tilted, will strike the ground, as shown in dotted lines in Fig. 2, and be rotated as the machine travels. When the toothed drum 47 strikes the ground, the cord 44 will immediately wind up thereon and pull the shifting-bar 39 to the rear of the platform 4, shifting the shock of corn down the inclined platform and depositing it upon the ground in upright position, the said bar 39 being returned to its normal position as soon as the platform 4 is thrown back to its normal position and the drum 47 raised out of contact with the ground by the take-up device 40, above referred to.

I claim—

1. In a machine for shocking corn, the combination with a shock-supporting platform, of stalk-cutting instrumentalities, a stalk-receiving and shock-forming crib on said platform having movable wall-sections and yielding means for holding said wall-sections normally in their forward position.

2. In a machine for shocking corn, the combination with a shock-supporting platform, of stalk-cutting instrumentalities, a stalk-receiving and shock-forming crib on said platform having flexible wall-sections, and yielding means for holding said wall-sections normally in their forward position.

3. In a machine for shocking corn, the combination with a shock-supporting platform, of stalk-cutting instrumentalities, a collapsible stalk-receiving and shock-forming crib on said platform, and yielding means for holding said crib normally in collapsed condition.

4. In a machine for shocking corn, the combination with a shock-supporting platform, of stalk-cutting instrumentalities, a stalk-receiving and shock-forming crib on said platform having flexible wall-sections formed of hinged boards, and yielding means for holding said wall-sections normally in their forward position.

5. In a machine for shocking corn, the combination with a shock-supporting platform, of stalk-cutting instrumentalities, stalk-carrying devices, means for feeding and compacting the stalks, a stalk-receiving and shock-forming crib having flexible wall-sections and yielding means for holding said wall-sections normally in their forward position.

6. In a machine for shocking corn, the combination with a shock-supporting platform, of stalk-cutting instrumentalities, stalk-carrying devices, means for feeding and compacting the stalks, a stalk-receiving and shock-forming crib having flexible wall-sections, yielding means for holding said wall-sections normally in their forward position, and means for automatically releasing said sections at a predetermined position.

7. In a machine for shocking corn, the combination with a shock-supporting platform, of stalk-cutting instrumentalities, stalk-carrying devices, means for feeding and compacting the stalks, a stalk-receiving and shock-forming crib having flexible wall-sections, yielding means for holding said wall-sections normally in their forward positions, means for automatically releasing said sections at a predetermined position, and means for tightening and tying a binder upon the shock.

8. In a machine for shocking corn, the combination of engaging arms to receive the ends of a crossed binder, a binder having one portion crossing another portion thereof adjacent to said arms and connected to the arms, and take-up means located intermediate of the ends of said arms and movable into the bight of the crossed binder to bear against the binder at the bight thereof to take up slack and compress the binder about the shock.

9. A shock-binder-tightening device for shocking-machines, comprising engaging arms to receive the ends of a crossed binder, take-up means movable into the bight of the crossed binder to take up slack and compress the binder about the shock, and means for locking said take-up means in adjusted position.

10. In a machine for shocking corn, the combination of engaging arms to receive the ends of a crossed binder, a binder having one portion crossing another portion thereof adjacent to said arms and connected to the arms, a take-up device movable into the bight of the crossed binder to bear against the binder at the bight thereof to take up slack and compress the shock, and means for rotating said take-up and tying device to twist or tie the binder.

11. A shock-binder tightening and tying device for shocking-machines comprising engaging arms to receive the ends of the crossed binder, a take-up device movable into the bight of said crossed binder to take up slack and compress the shock, means for locking said take-up in adjusted position, and means for rotating said take-up and tier to twist or tie the binder.

12. A shock-binder tightening and tying device for shocking-machines comprising a rotatable sleeve having engaging arms to receive the ends of the crossed binder, a take-up device sliding through said sleeve and movable into the bight of the crossed binder to take up slack and compress the shock, said take-up device engaging the said sleeve and being provided with means for rotating it; whereby said binder-engaging arms may be rotated and the crossed binder twisted or tied.

13. In a machine for shocking corn, the combination with a supporting-platform, of a shock-forming crib mounted thereon; stalk cutting, carrying and feeding instrumentalities; binder tightening and tying devices; a shock-shifting device to slide the formed shock from the platform; a ground-wheel to operate the said shock-shifting device; and means for tilting said platform to bring said ground-wheel into contact with the ground.

14. In a machine for shocking corn, the combination with a supporting-platform, of a shock-forming crib mounted thereon; stalk cutting, carrying and feeding instrumentalities; binder tightening and tying devices; a shock-shifting device to slide the formed shock from the platform; a ground-wheel to operate the said shock-shifting device, means for tilting said platform to bring said ground-wheel into contact with the ground; and means to automatically return said shifting device to its normal position.

15. In a corn-shocking machine, the combination with a supporting-platform, of a collapsible shock-forming crib thereon, yielding means for holding said crib in collapsed condition; stalk cutting, carrying, and feeding devices to deliver the stalks to said crib; and means for automatically releasing said crib when it has been distended to a predetermined point by the shock.

16. In a corn-shocking machine, the combination with a supporting-platform; of a collapsible shock-forming crib thereon; yielding means for holding said crib in collapsed condition; stalk cutting, carrying, and feeding devices to deliver the stalks to said crib; means for supporting a shock-binder in binding relation to the shock; and automatic release devices on said crib operable by said shock-binder, to release the crib when it has been distended to a predetermined point by the shock.

17. In a corn-shocking machine, the combination with a supporting-platform having a central longitudinal slot therein, a stalk-receiving and shock-forming crib mounted on said platform, stalk cutting, carrying and feeding devices to deliver the stalks to said crib, shock binding and tying devices, a shock-shifting bar mounted in said platform-slot, means normally tending to hold said bar in forward position, and means to cause it to traverse the platform and slide the shock therefrom.

In testimony whereof I affix my signature in presence of two witnesses.

WILLIAM HENRY GERNAND.

Witnesses:
JOHN KELLEY,
HARRY BRADFORD.